Sept. 27, 1949.  G. L. TERZINI  2,483,161
FOOD GRATER
Filed Nov. 29, 1947  2 Sheets-Sheet 1
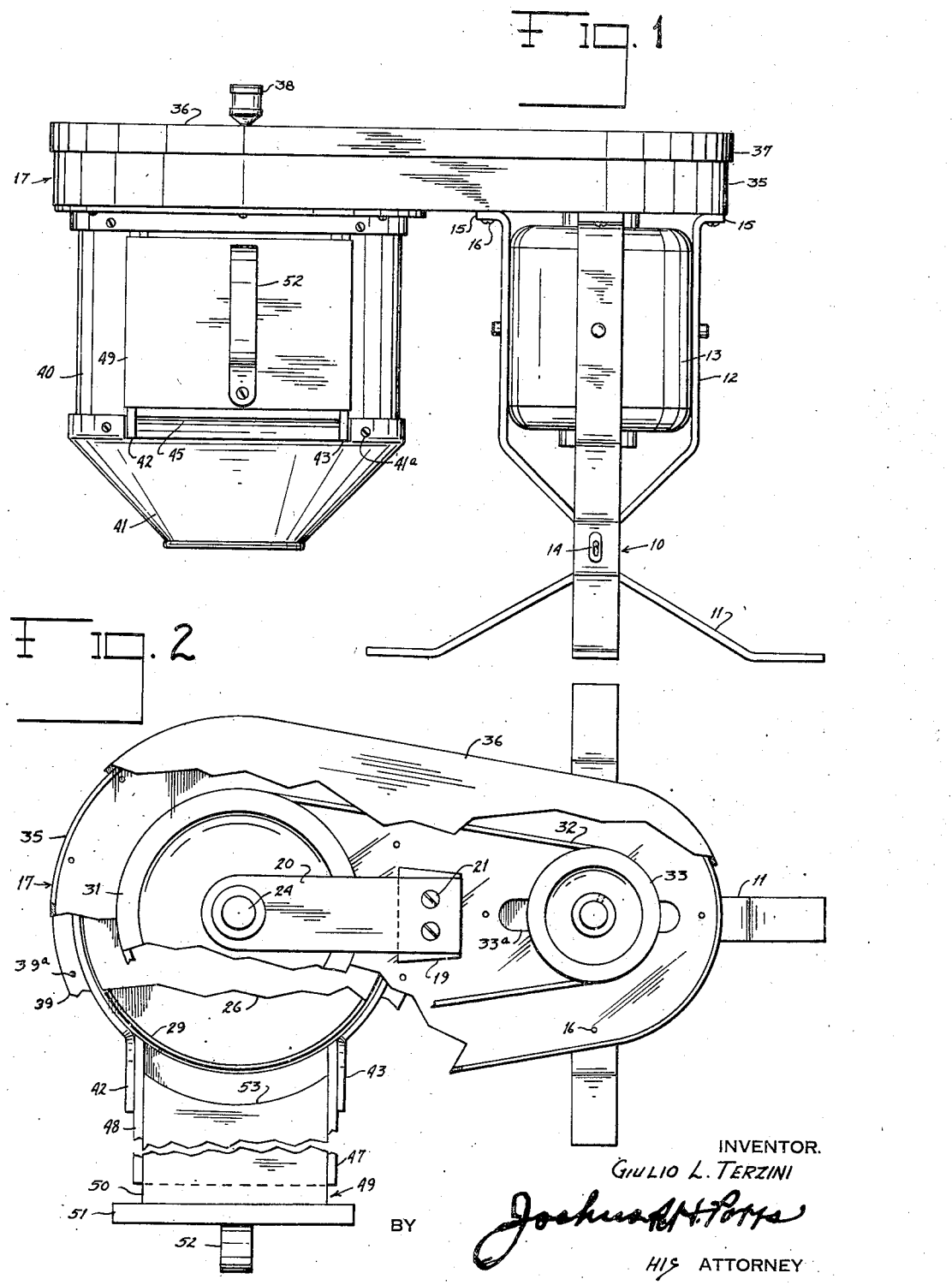
INVENTOR.
GIULIO L. TERZINI
BY Joshua H. Potts
HIS ATTORNEY

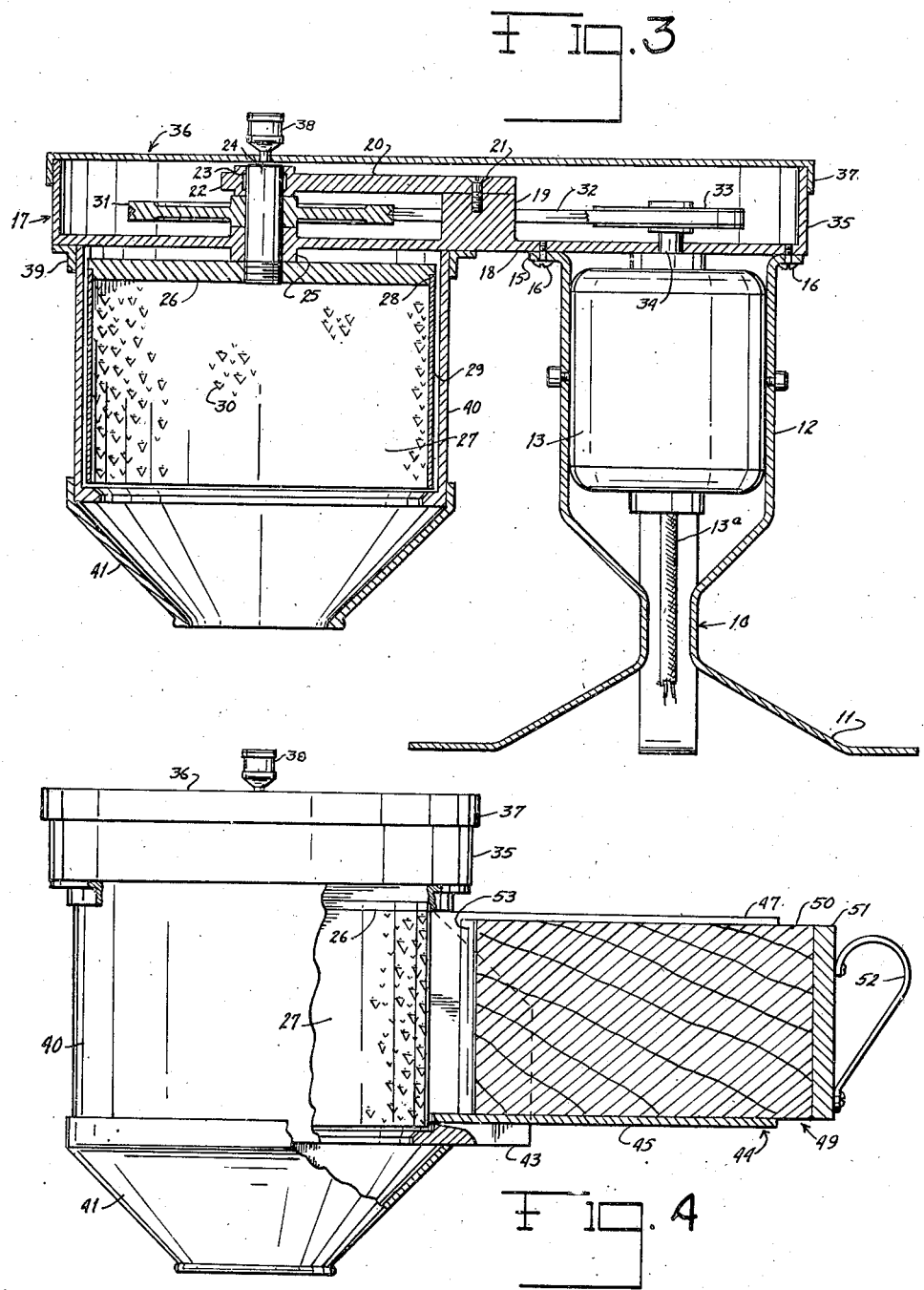

Patented Sept. 27, 1949

2,483,161

UNITED STATES PATENT OFFICE 2,483,161

FOOD GRATER

Giulio L. Terzini, Camden, N. J.

Application November 29, 1947, Serial No. 788,925

1 Claim. (Cl. 146—177)

This invention relates in general to food graters, and has for its principal object the provision of a machine of the kind indicated, of simplified design and rugged construction, assuring long life, ease of adjustment, and improved operating facilities.

Another object is to provide an improved food grater, particularly designed for the grating or comminuting of cheese, vegetables, and various articles of food, on a commercial scale.

Another object is the provision of an efficient food grater, particularly designed and adapted to perform its functions with simplicity of structure and wherever food products in general are to be comminuted.

Other objects and advantages of the improved, simplified design and construction will appear as the description proceeds, and will be more fully understood when taken in connection with the accompanying drawings wherein:

Figure 1 is a side elevational view of a preferred embodiment of the invention;

Fig. 2 is a plan view of the device, with parts broken away for clarity of illustration;

Fig. 3 is a transverse, sectional view of the machine; and

Fig. 4 is a fragmentary, elevational view, partly in section, of the hopper assembly and associated parts.

Referring now to the drawings wherein similar characters of reference indicate corresponding parts in the several views, the numeral 10 designates a support or stand having radially projecting feet 11 and spaced, upwardly extended arms 12 to which latter the operating motor 13 is attached. A toggle switch 14 on the stand 10 permits the motor to be turned on and off, as desired.

The arms 12 have flanged ends, as at 15, which are secured by screws 16 to an elongated casing, preferably formed of a light material such as aluminum and designated generally at 17, which serves, as hereinafter described more fully, as a guard and housing for the endless belt and moving parts associated with the motor and the food receiving hopper.

The casing 17 includes a bottom plate 18 having an upwardly projecting boss 19 on which an arm 20 is secured by screws 21. The enlarged outer end 22 of the arm 20 is apertured and recessed, as at 23, to rotatably receive a stud shaft 24 which also journals in a hub 25 integrally formed on the bottom 18 of the casing 17. The lower end of the stud shaft 24 is threadedly engaged in a central portion of a plate 26 forming a part of a comminuting member, designated generally at 27, and having an annular recess 28 in which the upper end of a drum or grater element 29 is secured.

The grater 29 has integrally formed prongs 30 against which the food to be comminuted is thrust, as described hereinafter. Secured to the stud shaft 24 is a sheave 31 engaged by an endless belt 32 in turn engaged by a sheave 33 on the shaft 34 of the motor 13. As best shown in Fig. 2, the motor shaft 34 is adjustably accommodated in an elongated slot 33a formed in the bottom plate 18. The casing 17 also includes the oval-shaped encircling wall 35 on which a lid or cover 36 having a depending flange 37 and an oil cup, indicated generally at 38, is seated. The oil cup 38 may be adjusted to feed a predetermined amount of lubricant to the stud shaft 24 during operation of the machine.

A ring 39 fastened to the under surface of the plate 18 has detachably secured to its inner periphery, as by the screws 39a, an enclosing or covering member 40 on the lower portion of which a conical hopper 41 is removably attached, as by the screws 41a. The member 40 is provided with a pair of spaced, integrally formed arms 42, 43 in which a food-receiving chute, designated generally at 44, is secured. The chute 44 comprises a bottom member 45 and two opposed sides 47, 48, the latter being suitably secured to the arms 42, 43. Slidably received in the chute 44, which communicates with the grater drum 29, is a pusher member 49 which includes a block 50 having a front panel 51 and a handle 52. The end of the block 50, which engages the food, is preferably concaved, as at 53.

The function and mode of operation of the device, which have been in large measure indicated above, may be summarized as follows:

Assuming the motor 13 is energized from a source of power via the conducting cable 13a, movement will be communicated by the sheaves 31, 33 and the belt 32 to the stud shaft 24 on sheave 31. As the stud shaft rotates, the attached grating drum 29 will comminute food thrust thereagainst by the pusher member 49. The comminuted particles of food falling into the hopper 41 may be collected in a receptacle beneath the open outlet of the said hopper.

While certain preferred embodiments of the invention are hereinbefore set forth, it is to be clearly understood that the invention is not to be limited to the exact construction illustrated and described because various modifications of the details may be provided in putting the inven-

What is claimed is:

In a food grater of the kind described, in combination, a stand, a motor arranged on said stand and having a shaft extending therefrom in a vertical plane and in alignment with the longitudinal axis of the stand, an elongated casing, a lid for said casing, a shaft turnably supported in the casing, means operably connecting the shaft to the motor, an arm supporting the last-mentioned shaft and fastened to the casing, a food grating member fastened to one end of the said last-mentioned shaft, a cylindrical housing for the food grating element, a chute communicating with the grater and supported on the cylindrical housing, and a pusher block slidably mounted in the chute.

GIULIO L. TERZINI.

REFERENCES CITED

The following references are of record in the file of this patent:

UNITED STATES PATENTS

| Number | Name | Date |
|---|---|---|
| 1,551,767 | Oehmig | Sept. 1, 1925 |
| 1,629,138 | Adamson | May 17, 1927 |
| 1,746,654 | Hufford | Feb. 11, 1930 |
| 1,789,776 | Sauls | Jan. 20, 1931 |
| 2,416,432 | Brady | Feb. 25, 1947 |

FOREIGN PATENTS

| Number | Country | Date |
|---|---|---|
| 200,012 | Switzerland | Dec. 1, 1938 |